US012006675B2

(12) United States Patent
Kim et al.

(10) Patent No.: US 12,006,675 B2
(45) Date of Patent: Jun. 11, 2024

(54) FLOW RATE CONTROL VALVE HAVING WATERPROOF FUNCTION OF DRIVING MOTOR AND BIDET DEVICE TO WHICH FLOW RATE CONTROL VALVE IS APPLIED

(71) Applicant: COWAY CO., LTD., Gongju-si (KR)

(72) Inventors: Youngpyo Kim, Seoul (KR); Hyun Kang Lee, Seoul (KR); Minsu Song, Seoul (KR); Dong Ik Nam, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 490 days.

(21) Appl. No.: 17/285,361

(22) PCT Filed: Sep. 17, 2019

(86) PCT No.: PCT/KR2019/011954
§ 371 (c)(1),
(2) Date: Apr. 14, 2021

(87) PCT Pub. No.: WO2020/080684
PCT Pub. Date: Apr. 23, 2020

(65) Prior Publication Data
US 2021/0372110 A1    Dec. 2, 2021

(30) Foreign Application Priority Data
Oct. 15, 2018    (KR) .................. 10-2018-0122827

(51) Int. Cl.
*E03D 9/08*    (2006.01)
*B05B 9/04*    (2006.01)
(Continued)

(52) U.S. Cl.
CPC .............. *E03D 9/08* (2013.01); *B05B 9/0403* (2013.01); *B05B 15/555* (2018.02); *F16K 31/047* (2013.01); *F16K 41/106* (2013.01)

(58) Field of Classification Search
CPC ....................................................... E03D 9/08
See application file for complete search history.

(56) References Cited

U.S. PATENT DOCUMENTS

| 4,208,746 | A | * | 6/1980 | Minamoto | ............... E03D 9/08 392/471 |
| 7,013,502 | B2 | | 3/2006 | Pacheco | |
| 2005/0086729 | A1 | | 4/2005 | Pacheco | |

FOREIGN PATENT DOCUMENTS

| JP | 2015-132113 A | 7/2015 |
| KR | 10-2006-0078968 A | 7/2006 |

(Continued)

OTHER PUBLICATIONS

International Search Report dated Dec. 30, 2019 in PCT/KR2019/011954 filed on Sep. 17, 2019, 2 pages.

*Primary Examiner* — Christine J Skubinna
(74) *Attorney, Agent, or Firm* — Oblon, McClelland, Maier & Neustadt, L.L.P.

(57) ABSTRACT

A flow rate control valve has a waterproof function of a driving motor. The flow rate control valve is for transferring a fluid pumped by a water supply pump to a nozzle unit and a nozzle cleaning unit for cleaning the nozzle unit. The flow rate control valve includes at least one housing in which the fluid pumped by the water supply pump is accommodated, and at least one driving motor configured to change a communication area of each of the at least one housing, the nozzle unit, and the nozzle cleaning unit by rotation. At least one sealing adapter is formed between the at least one housing and the at least one driving motor so as to prevent the fluid from flowing into the at least one driving motor.

6 Claims, 4 Drawing Sheets

(51) Int. Cl.
  *B05B 15/555* (2018.01)
  *F16K 31/04* (2006.01)
  *F16K 41/10* (2006.01)

(56) References Cited

FOREIGN PATENT DOCUMENTS

| | | |
|---|---|---|
| KR | 20-2009-0000751 U | 1/2009 |
| KR | 10-2011-0109490 A | 10/2011 |
| KR | 10-1371296 B1 | 3/2014 |
| KR | 10-2016-0124936 A | 10/2016 |

\* cited by examiner

FLOW RATE CONTROL VALVE HAVING WATERPROOF FUNCTION OF DRIVING MOTOR AND BIDET DEVICE TO WHICH FLOW RATE CONTROL VALVE IS APPLIED

TECHNICAL FIELD

The present disclosure relates to a flow rate control valve having a waterproof function of a driving motor and a bidet device to which the flow rate control valve is applied.

BACKGROUND ART

A bidet is a device that is installed in a toilet seat and sprays cleaning water through a nozzle unit provided in a bidet device to automatically perform anal cleaning and female local cleaning.

Because the bidet device is a cleaning device using water, it is significant to protect internal components of the bidet device that are sensitive to moisture. More specifically, in the bidet device, condensation is generated by a hot water tank and each flow path, and when the bidet device is used for a long time, moisture is introduced into major internal components due to separation of a hose or a component failure, so that the possibility that a device failure may occur due to moisture inflow is high. Thus, the need for a bidet device that prevents moisture inflow into internal components has always been discussed.

A fluid sprayed through a nozzle unit 300 is pumped from a water supply pump, and the pumped fluid is accommodated in a first housing 410 and a second housing 420, and a communication area between the first housing 410 and a nozzle cleaning unit 800 and between the second housing 420 and the nozzle unit 300 is controlled by the operation of driving motors 430 and 440 so that the amount of the fluid sprayed through each nozzle is controlled.

As such, the driving motors 430 and 440 are connected to the housings 410 and 420 to which the fluid is transferred. However, a connection portion between the driving motors 430 and 440 is not sealed, and thus moisture is introduced so that the driving motors 430 and 440 are exposed to moisture, and as the driving motors 430 and 440 rotate, sealing between components connected to the driving motors 430 and 440 and packing is broken.

This causes continuous exposure to moisture of the driving motors 430 and 440 and causes a problem in the entire operation of a bidet device 5000.

(Patent Document 1) Korean Patent Registration No. 10-1371296 (Mar. 10, 2014)
(Patent Document 2) Korean Patent Laid-open Publication No. 10-2016-0124936 (Oct. 31, 2016)

DETAILED DESCRIPTION OF THE INVENTION

Technical Problem

The present disclosure provides a flow rate control valve having a waterproof function of a driving motor, and more particularly to a flow rate control valve in which a sealing adapter is applied between the driving motor and a housing so that moisture can be prevented from being introduced into the driving motor.

Technical Solution

According to an aspect of the present disclosure, there is provided a flow rate control valve having a waterproof function of a driving motor for transferring a fluid pumped by a water supply pump (P) to a nozzle unit (300) and a nozzle cleaning unit (800) for cleaning the nozzle unit (300), the flow rate control valve including: one or more housings (410, 420) in which the fluid pumped by the water supply pump (P) is accommodated; and one or more driving motors (430, 440) configured to change a communication area of each of the one or more housings (410, 420), the nozzle unit (430), and the nozzle cleaning unit (800) by rotation, wherein one or more sealing adapters (450, 460) are formed between the one or more housings (410, 420) and the one or more driving motors (430, 440) so as to prevent the fluid from flowing into the one or more driving motors (430, 440).

The one or more sealing adapters (450, 460) may include: a first sealing member (451), which is made of a foam material and in which a through hole is formed through which rotation shafts (431, 441) of the one or more driving motors (430, 440) pass; second sealing members (453, 463) into which the rotation shafts (431, 441) passing through the through hole of the first sealing member (451) are inserted and which are rotated by driving of the one or more driving motors (430, 440) and have a container shape in which the fluid is accommodable; rotational force transmission members (454, 464) configured to rotate flow rate control members (458, 468) according to rotation of the second sealing members (453, 463); and the flow rate control members (458, 468) coupled to the rotational force transmission members (454, 464) and configured to change a communication area of each of the one or more housings (410, 420), the nozzle unit (430), and the nozzle cleaning unit (800) by rotation.

The flow rate control members (458, 468) may extend along a circumferential direction and may include fan-shaped flow rate control grooves (458a, 468a) formed through the flow rate control members (458, 468).

The flow rate control valve may further include elastic members (457, 467) interposed between the rotational force transmission members (454, 464) and the flow rate control members (458, 468) and allowing the flow rate control members (458, 468) to be in close contact with flow path communication members (471, 481).

The flow rate control valve may further include: third sealing members (455, 465) coupled to coupling grooves (454b, 464b) extending along peripheries of the rotational force transmission members (454, 464); and fourth sealing members (456, 466) configured to seal edges of inner spaces of the second sealing members (453, 463).

The one or more housings (410, 420) may include two housings of a first housing (410) and a second housing (420), and the one or more driving motors (430, 440) may include two driving motors of a first driving motor (430) connected to the first housing (410) and a second driving motor (440) connected to the second housing (420), and the first driving motor (430) may control the amount of the fluid transferred to the nozzle cleaning unit (800) from the first housing (410), and the second driving motor (440) may control the amount of the fluid transferred to the nozzle unit (300) from the second housing (420).

According to another aspect of the present disclosure, there is provided a bidet device to which the flow rate control valve described above is applied.

Effects of the Invention

According to the present disclosure, in a flow rate control valve applied to a bidet device according to the related art, leakage of water generated when a driving motor and a housing are directly connected to each other can be prevented from being introduced into the driving motor. Specifically, a sealing adapter serving as a waterproof function between the driving motor and the housing is applied so that moisture flowing out of the housing does not flow into the driving motor, thereby extending the life of the driving motor.

The waterproofing of such a driving motor is not performed by only one member, but double and triple members perform a waterproof function so that even if one member wears out and loses the waterproof function, due to the waterproof function of other members, moisture still may not be introduced into the driving motor.

Accordingly, even if a bidet device is used for a long period of time, the same amount of a fluid may be discharged from a nozzle unit 300 and a nozzle cleaning unit 800.

MODE OF THE INVENTION

Hereinafter, the present disclosure will be described in detail with reference to the accompanying drawings.

In addition, hereinafter, assuming that a user sits on a toilet seat 1 in FIG. 1, it will be described that the upper part of the user is an upper side and the lower part of the user is a lower side, the user's viewing direction is the front, the back direction is the rear, and a portion where the user's left hand is located is a left side, and a portion where the user's right hand is located is a right side.

1. Description of Bidet Device

A bidet device 5000 according to an embodiment of the present disclosure will be described in detail with reference to FIG. 1.

Figure 1:
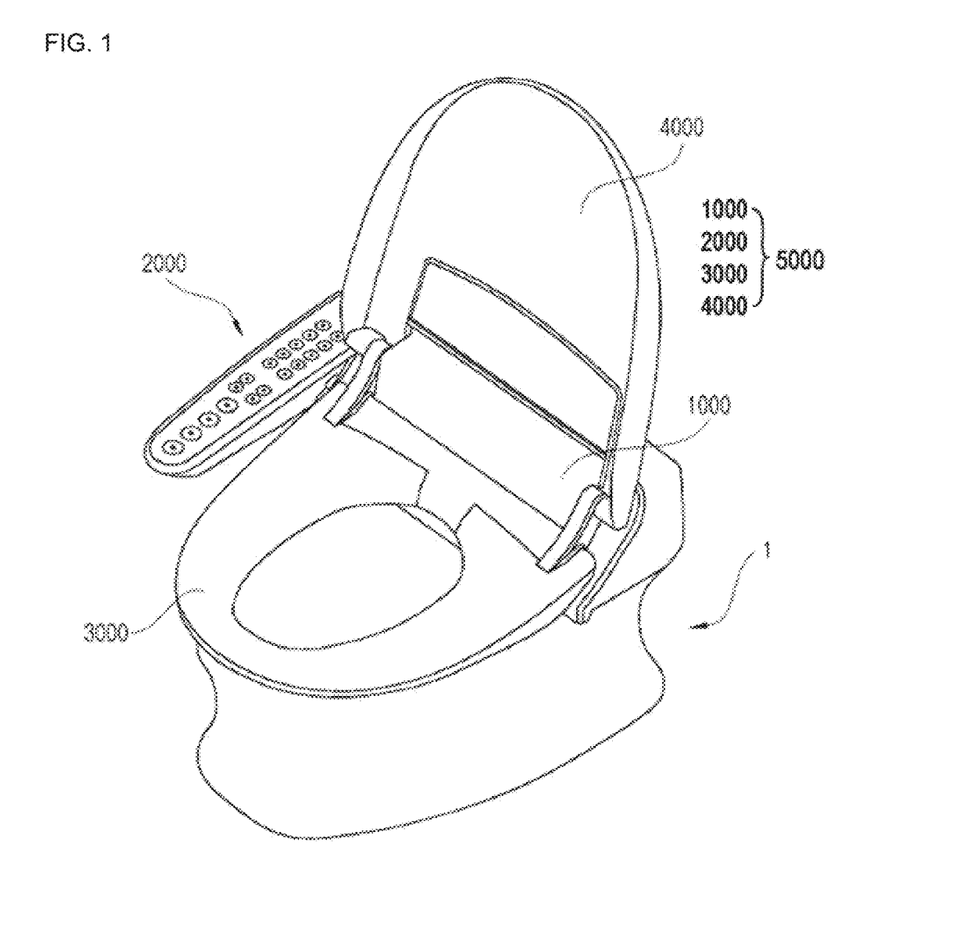
FIG. 1 is a view illustrating a toilet seat on which a bidet device is installed according to an embodiment.

FIG. 1 is a schematic perspective view of a toilet seat in which the bidet device 5000 according to an embodiment of the present disclosure is installed.

Referring to FIG. 1, the bidet device 5000 includes a bidet main body 1000 fixedly installed on the toilet seat 1, a seat 3000 rotatably mounted on the upper side of the toilet seat 1, a cover 4000 rotatably mounted on the seat 3000, and an operation unit 2000 mounted on the side of the bidet main body 1000.

The operation unit 2000 is provided with buttons for performing water pressure, water temperature, positions of bidet nozzles and cleaning nozzles, a sterilization function, a drying function, and the like. When a command is input to each button in the form of a user pressing or the like, a function corresponding to the button is performed.

2. Description of Bidet Main Body

Figure 2:
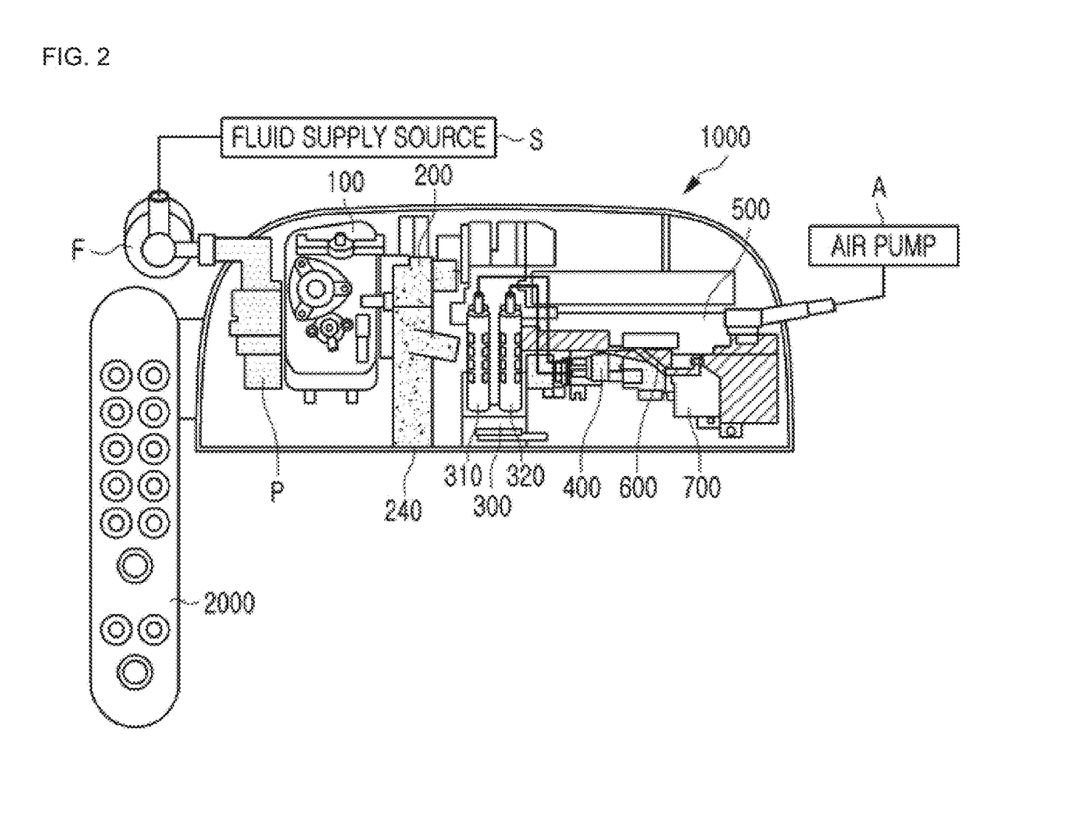
FIG. 2 is a view illustrating the entire structure of a bidet main body of FIG. 1.

The bidet main body 1000 according to an embodiment of the present disclosure will be described in detail with reference to FIG. 2.

A water supply pump P, a hot water tank 100, a drying unit 200, a nozzle unit 300, a flow rate control valve 400, a main PBA 500, a waterproof cover 600, and a ceramic sterilization unit 700 may be installed inside the bidet main body 1000.

The water supply pump P is a unit that pumps a fluid from a fluid supply source such as a water supply tank. While the fluid pumped by the water supply pump P passes through a filter F, foreign substances of the fluid are removed, and the fluid is transferred to the hot water tank 100, the flow rate control valve 400, and the ceramic sterilization unit 700.

The hot water tank 100 is a portion in which a heating line provided therein heats water transferred into the hot water tank 100 and hot water formed by heating is stored. When a cleaning command for using hot water is input to the operation unit 2000, hot water stored in the hot water tank 100 is discharged through the nozzle unit 300.

The drying unit 200 is a unit in which a blower installed at the rear end of the drying unit 200 is rotated to draw air inside the bidet main body 1000, and the air is sprayed toward the user's anus or female local part through a discharge port. That is, when the anus or the female local part is cleaned by spraying the cleaning water from the nozzle unit 300, the air discharged to the outside through the drying unit 200 is in contact with the anus or the female local part to dry moisture.

The nozzle unit 300 is a unit which is installed in the center of the bidet main body 1000 and in which the fluid is sprayed to the user's anus or the female local part. Each of nozzles 310 and 320 of the nozzle unit 300 is connected to the flow rate control valve 400 to clean the user's anus or the female local part with a preset flow rate and water flow.

The flow rate control valve 400 is a portion which is connected to the water supply pump P and controls the flow rate and water flow supplied to each of the nozzles 310 and 320 according to an input command operated by the operation unit 2000. In addition, the flow rate control valve 400 may be connected to the air pump A to supply the air to the fluid discharged through each of the nozzles 310 and 320.

The main PBA 500 is a portion which is installed in a vertical direction from the bottom surface of the bidet main body 1000 behind the flow rate control valve 400. More specifically, the front and rear surfaces (meaning the widest surface) of the main PBA 500 are installed to face in the front and rear directions. The main PBA 500 is a core component of the bidet device 5000, and components necessary for the operation of the bidet device 5000 such as memory, a CPU, and the like may be installed in the main PBA 500, and various circuits required for the operation are installed in the main PBA 500 to control the operation of the bidet device 5000. In addition, alternatively, the main PBA 500 may be integrally formed in the operation unit 2000.

As described above, when the operation unit 2000 is provided in the firm of a remote control, an RF module for receiving an operation command from the operation unit 2000 may be further installed on the upper side of the drying unit 200. The RF module is preferably wirelessly connected to the operation unit 2000, and the RF module that receives the operation command transmits the operation command to the main PBA 500.

The waterproof cover 600 is installed between the flow rate control valve 400 and the main PBA 500 and is a portion that prevents moisture flowing out from the flow rate control valve 400, moisture flowing out from a connection portion between the flow rate control valve 400 and the nozzle unit 300, and moisture falling from the ceiling surface of the bidet main body 1000 from flowing into the main PBA 500.

The ceramic sterilization unit 700 is formed on the left side of the flow rate control valve 400, pumps a cleaning solution from a cleaning solution reservoir, and sprays the cleaning solution toward the inner surface of the toilet seat 1 through a ceramic cleaning nozzle. Because the inner surface of the toilet seat 1 is a surface that is in direct contact with waste such as urine and feces, the cleaning solution having a sterilizing function can be sprayed to keep the ceramic inside the toilet seat 1 clean.

The above-described flow rate control valve 400, the main PBA 500, the waterproof cover 600, and the ceramic sterilization unit 700 are disposed on one side of the left and right sides around the nozzle unit 300, and the water supply pump P, the hot water tank 100, and the drying unit 200 are disposed on the opposite side of the flow rate control valve 400, the main PBA 500, the waterproof cover 600, and the ceramic sterilization unit 700 around the nozzle unit 300. That is, by dividing the bidet main body 1000 in half around the nozzle unit 300, the flow rate control valve 400, the main PBA 500, the waterproof cover 600, and the ceramic sterilization unit 700 are installed on one side, and the water supply pump P, the hot water tank 100, and the drying unit 200 are installed on the other side.

The water supply pump P, the hot water tank 100, the drying unit 200, and the nozzle unit 300 may be formed from the right to the left of the bidet main body 1000, and the flow rate control valve 400 and the main PBA 500 are formed on the left side of the nozzle unit 300, and the flow rate control valve 400 is formed in front of the main PBA 500, so that the size of the bidet main body 1000 can be reduced.

As such, because the installation location of each component for performing the function of the bidet device 5000 is set in advance, even if different models are manufactured from high-priced models to low-cost models, the bidet main body 1000 can be assembled by only using the same bidet main body 1000 and adding or removing each component so that manufacturing efficiency can be improved.

3. Description of Flow Rate Control Valve

Figure 3:
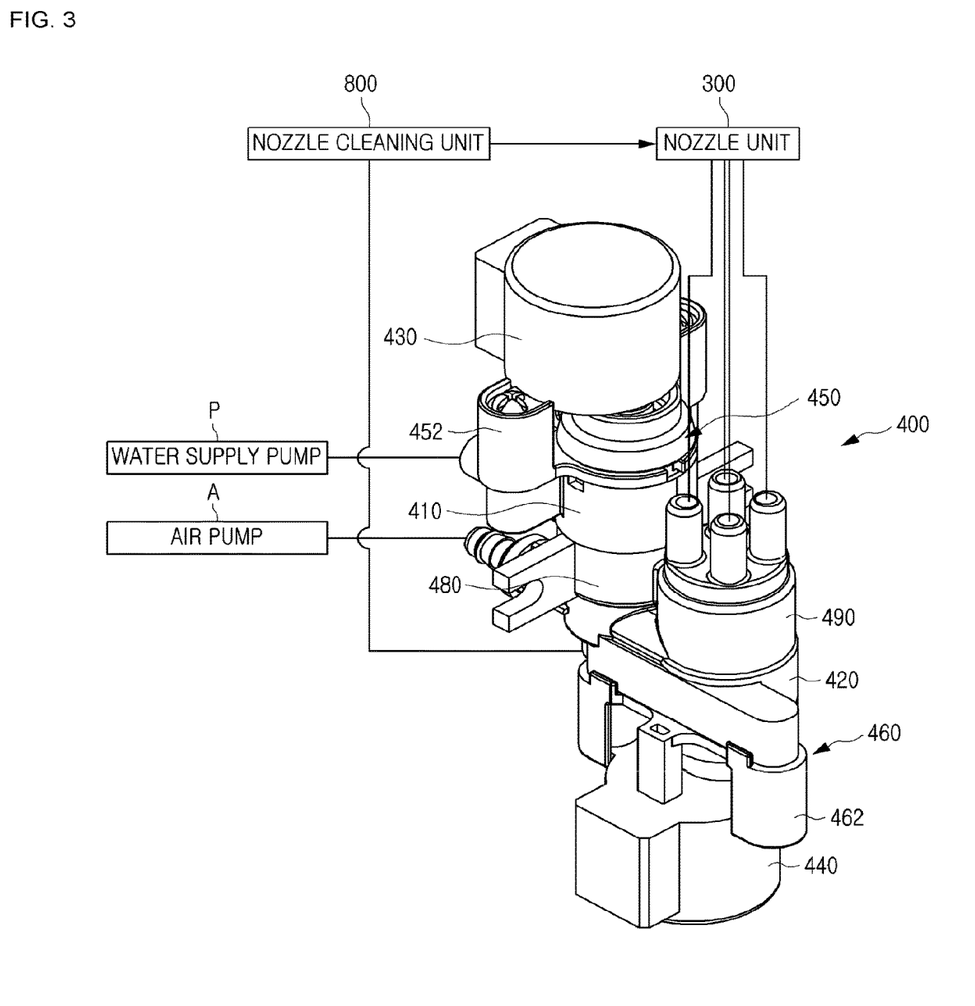
FIG. 3 is a perspective view of a flow rate control valve of FIG. 1.

The flow rate control valve 400 according to an embodiment of the present disclosure includes one or more housings 410 and 420, one or more driving motors 430 and 440, and one or more sealing adapters 450 and 460 arranged between the housings 410 and 420 and the driving motors 430 and 440.

The housings 410 and 420 are portions in which the fluid pumped from the water supply pump P is accommodated, and one end of the housings 410 and 420 is connected to the sealing adapters 450 and 460, and the other end thereof is connected to connection portions 480 and 490 connected to the nozzle unit 300 and the nozzle cleaning unit 800.

The driving motors 430 and 440 rotate flow rate control members 458 and 468, to be described later, so that the communication area of each of the housings 410 and 420 and the nozzle unit 300 and the nozzle cleaning unit 800 is changed. Rotation shafts 431 and 441 rotated by driving are formed in the center of the driving motors 430 and 440, and coupling protrusions 430a, 430b, 440a, and 440b for coupling to the housings 410 and 420 are formed at both side ends of the driving motors 430 and 440.

The sealing adapters 450 and 460 are located between the housings 410 and 420 and the driving motors 430 and 440 so that moisture that may leak from the housings 410 and 420 can be prevented from directly flowing into the driving motors 430 and 440.

A housing, a driving motor, and a sealing adapter therebetween function as one flow rate control valve, and in this case, the first housing 410, the first driving motor 430, and the first sealing adapter 450 are portions that control the amount of the fluid transferred to the nozzle cleaning unit 800 for cleaning the nozzle unit 300, and the second housing 420, the second driving motor 440, and the second sealing adapter 460 are portions that control the amount of the fluid sprayed toward the users anus or the female local part through the nozzle unit 300.

The fluid controlled by each flow rate control valve is transferred to connection pipes formed at one end of the connection portions 480 and 490, and the fluid is transferred to the nozzle unit 300 and the nozzle cleaning unit 800 connected to each of the connection pipes via a hose.

In FIG. 3, two housings 410 and 420 and two driving motors 430 and 440 are provided. However, one or three or more housings 410 and 420 and one or three or more driving motors 430 and 440 may be provided depending on the function.

Figure 4:
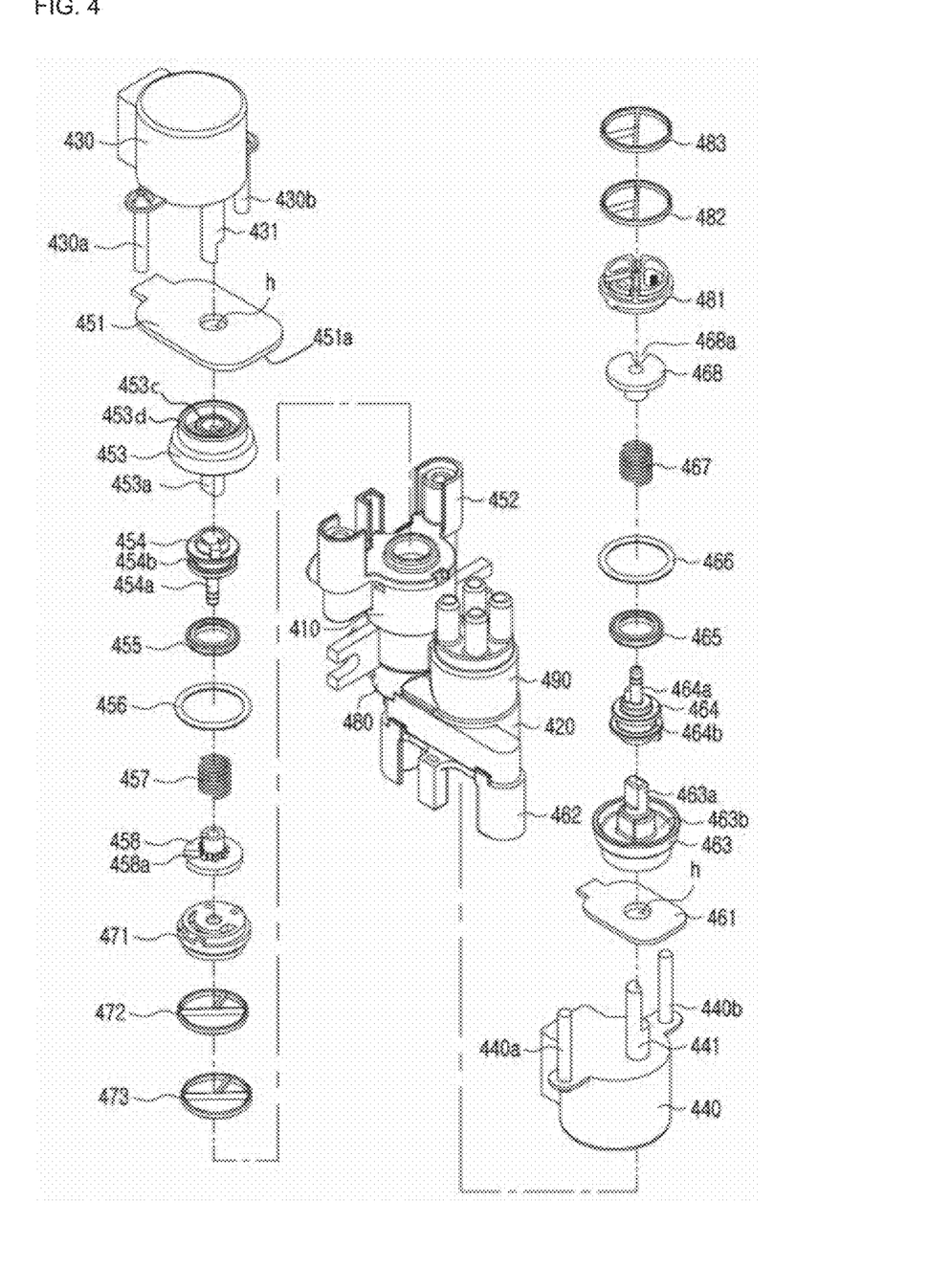
FIG. 4 is an exploded perspective view of a sealing adapter of the flow rate control valve of FIG. 3.

The sealing adapters 450 and 460 according to the embodiment of the present disclosure will be described in more detail with reference to FIG. 4. FIG. 4 is an exploded perspective view illustrating the sealing adapters 450 and 460 according to an embodiment of the present disclosure.

The detailed configurations of each of the sealing adapters 450 and 460 are the same, and only reference numerals are different. Hereinafter, a first sealing adapter 450 will be used as an example to be described in detail.

The first sealing adapter 450 includes a first sealing member 451, a coupling portion 452, a second sealing member 453, a rotational force transmission member 454, a third sealing member 455, a fourth sealing member 456, an elastic member 457, and a flow rate control member 458.

The first sealing member 451 is in direct contact with the first driving motor 430, and specifically, a through hole h is formed through which the rotation shaft 431 of the first driving motor 430 passes. As shown in FIG. 4, the first sealing member 451 includes a planar support surface 451a formed on a portion where the first sealing member 451 overlaps the second sealing member 452. The first sealing member 451 is located closest to the first driving motor 430, which means that the first sealing member 451 is located farthest from the first housing 410. Because the fluid pumped by the water supply pump P is accommodated in the first housing 410, the possibility of the components located close to the first housing 410 being likely to expose by fluid flowing out from the first housing 410 is high, Because the first sealing member 451 is formed of a foam material, the first sealing member 451 absorbs a certain portion of moisture flowing into the first driving motor 430 and prevents the leaked moisture from coming into direct contact with the first driving motor 430.

The coupling portion 452 is a portion located on the first housing 410, and the second sealing member 453, the rotational force transmission member 454, the third sealing member 455, the fourth sealing member 456, the elastic member 457, and the flow rate control member 458, which will be described later, are sequentially assembled on the upper side of the coupling portion 452 and are fastened with the coupling protrusions 430a and 430b of the first driving motor 430 to fix the first sealing adapter 450 and the first driving motor 430 to the first housing 410.

The rotation shaft 431 of the first driving motor 430 penetrating through the through hole h of the first sealing member 451 is inserted into the second sealing member 453, and the rotation shaft 453a of the second sealing member 453 rotates together with the rotation shaft 431 of the first driving motor 430. In addition, preferably, the second sealing member 453 is provided in a container shape to accommodate the fluid therein so that a space portion 453b capable of receiving a predetermined amount of moisture discharged from the first housing 410 is formed. Furthermore, the second sealing member 453 may include an inner sidewall 453c and an outer sidewall 453d, which are arranged spaced apart from each other along a radial direction so that the fluid can be accommodated in the second sealing member 453.

The rotation shaft 453a of the second sealing member 453 is inserted into the rotational force transmission member 454, so that the rotational force of the rotation shaft 431 of the first driving motor 430 is transmitted through the rotational shaft 453a of the second sealing member 453. A coupling groove 454b is formed to extend along the periphery of the rotational force transmission member 454, and the third sealing member 455 is coupled to the coupling groove 454b to seal the coupling groove 454b.

The fourth sealing member 456 is a portion that is seated on the space portion 453b of the second sealing member 453 and seals the edge of the space portion 453b.

The elastic member 457 passes through the rotation shaft 454a of the rotational force transmission member 454, is placed between the rotational force transmission member 454 and the flow rate control member 458, and allows the flow rate control member 458 to be in close contact with a flow path communication member 471.

The flow rate control member 458 is a portion that is finally rotated by the rotation of the rotation shaft 431 of the first driving motor 430, and the flow rate control member 458 extends along the circumferential direction, and a fan-shaped flow rate control groove 458a is formed through the flow rate control member 458. As the flow rate control groove 458a is formed in a fan shape, the area in which the flow rate control member 458 communicates with the first housing 410 and the nozzle cleaning unit 800 is adjusted by rotation, and thus the amount of the fluid transferred to the nozzle cleaning unit 800 can be controlled. This is not a key feature of the present disclosure, and thus, a detailed description thereof will be omitted.

That is, in a flow rate control valve according to the related art, the driving motors 430 and 440 and the housings 410 and 420 are directly connected to one another, so that components of the housings 410 and 420 adjacent to the driving motors 430 and 440 wear out according to the rotation of the driving motors 430 and 440, and the fluid contained therein leaks out, causing a failure of the driving motors 430 and 440. However, the flow rate control valve 400 according to the embodiment of the present disclosure further includes sealing adapters 450 and 460 between the driving motors 430 and 440 and the housing 410 and 420 so that instead of the driving motors 430 and 440 being directly connected to the housings 410 and 420, the driving motors 430 and 440 are placed between the housings 410 and 420, and thus, even if the fluid leaks out, the first through fourth sealing members 451, 453, 455, and 456 prevent the fluid from flowing into the driving motors 430 and 440 and prevent a failure of the driving motors 430 and 440.

The flow rate control valve according to the present disclosure can prevent leakage of water generated by directly connecting the driving motor and the housing in the flow rate control valve applied to a bidet device according to the related art from flowing into the driving motor. Specifically, a sealing adapter serving as a waterproof function between the driving motor and the housing is applied so that moisture flowing out of the housing does not flow into the driving motor, thereby extending the life of the driving motor.

The waterproofing of such a driving motor is not performed by only one member, but double and triple members perform a waterproof function so that even if one member wears out and loses the waterproof function, due to the waterproof function of other members, moisture still may not be introduced into the driving motor.

Accordingly, even if a bidet device is used for a long period of time, the same amount of a fluid may be discharged from a nozzle unit 300 and a nozzle cleaning unit 800.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

EXPLANATION OF REFERENCE NUMERALS

1: toilet seat
100: hot water tank
200: drying unit
300: nozzle unit
310, 320: nozzle
400: flow rate control valve
410: first housing
420: second housing
430: first driving motor
431: rotation shaft
430a, 430b: coupling protrusion
440: second driving motor
450: first sealing adapter
451: first sealing member
452: coupling portion
453: second sealing member
454: rotational force transmission member
455: third sealing member
456: fourth sealing member
457: elastic member
458: flow rate control valve
460: second sealing adapter
461: first sealing member
462: coupling portion
463: second sealing member
464: rotational force transfer member
465: third sealing member
466: fourth sealing member
467: elastic member
468: flow rate control valve
471: flow path communication member
480, 490: connection portion
500: main PBA
600: waterproof cover
700: ceramic sterilization unit
800: nozzle cleaning unit
1000: bidet main body
2000: operation unit
3000: seat
4000: cover
5000: bidet device

The invention claimed is:

1. A flow rate control valve having a waterproof function of a driving motor, for transferring a fluid pumped by a water supply pump to a nozzle unit and a nozzle cleaning unit for cleaning the nozzle unit, the flow rate control valve comprising:
at least one housing in which the fluid pumped by the water supply pump is accommodated; and
at least one driving motor configured to change a communication area of each of the at least one housing, the nozzle unit, and the nozzle cleaning unit by rotation, wherein at least one sealing adapter is formed between the at least one housing and the at least one driving motor so as to prevent the fluid from flowing into the at least one driving motor, wherein the at least one sealing adapter comprises:
- a first sealing member, in which a through hole is formed through which rotation shafts of the at least one driving motor pass;
- second sealing members into which the rotation shafts passing through the through hole of the first sealing member are inserted and which are rotated by driving of the at least one driving motor, and which have a space portion in which the fluid is configured to be accommodated; and
- rotational force transmission members configured to rotate flow rate control members according to rotation of the second sealing members, and wherein the flow rate control members are coupled to the rotational force transmission members and are configured to change the communication area of each of the at least one housing, the nozzle unit, and the nozzle cleaning unit by the rotation.

2. The flow rate control valve of claim 1, wherein the flow rate control members extend along a circumferential direction and comprise fan-shaped flow rate control grooves formed through the flow rate control members.

3. The flow rate control valve of claim 2, further comprising:
- third sealing members coupled to coupling grooves extending along peripheries of the rotational force transmission members; and
- fourth sealing members configured to seal edges of inner spaces of the second sealing members.

4. The flow rate control valve of claim 1, further comprising elastic members interposed between the rotational force transmission members and the flow rate control members and allowing the flow rate control members to be in close contact with flow path communication members.

5. The flow rate control valve of claim 4, wherein
the at least one housing comprises a first housing and a second housing,
the at least one driving motor comprises a first driving motor connected to the first housing and a second driving motor connected to the second housing,
the first driving motor controls an amount of the fluid transferred to the nozzle cleaning unit from the first housing, and
the second driving motor controls an amount of the fluid transferred to the nozzle unit from the second housing.

6. A bidet device comprising the flow rate control valve of claim 5.

* * * * *